United States Patent [19]

Thorne

[11] Patent Number: 4,654,772
[45] Date of Patent: Mar. 31, 1987

[54] POWER SUPPLY FOR ELECTROSTATIC AIR CLEANER

[75] Inventor: Richard L. Thorne, Elgin, Ill.

[73] Assignee: Fyrnetics, Inc., Elgin, Ill.

[21] Appl. No.: 836,980

[22] Filed: Mar. 6, 1986

[51] Int. Cl.$^4$ ............................................. H02M 3/335
[52] U.S. Cl. ........................................ 363/19; 363/97;
55/139
[58] Field of Search ..................... 363/18–19,
363/49, 97, 131; 331/112; 55/105, 139; 323/903

[56] References Cited

U.S. PATENT DOCUMENTS

| | | | |
|---|---|---|---|
| 3,872,370 | 3/1975 | Regnault | 55/139 X |
| 3,973,220 | 8/1976 | Fender et al. | 363/131 X |
| 4,092,710 | 5/1978 | Wadsworth | 363/19 |
| 4,321,507 | 3/1982 | Bosnak | 363/19 X |

FOREIGN PATENT DOCUMENTS 1001368  2/1983  U.S.S.R. .............................. 363/19

*Primary Examiner*—Peter S. Wong
*Attorney, Agent, or Firm*—James W. Potthast

[57] ABSTRACT

A power supply for an electrostatic air cleaner incorporates a high frequency oscillator and a step-up transformer. The transformer includes a primary winding in series with a transistor, a secondary winding which cooperates with a voltage multiplying means to produce a desired output voltage for energizing the cell, and a feedback winding. The feedback winding is connected in circuit with the emitter-base circuit of the transistor and is responsive to voltage induced therein for effecting repetitive conduction and non-conduction of the transistor. The feedback winding is further connected in circuit with circuit means for adjusting and limiting the biasing of the transistor.

2 Claims, 2 Drawing Figures

U.S. Patent   Mar. 31, 1987   4,654,772
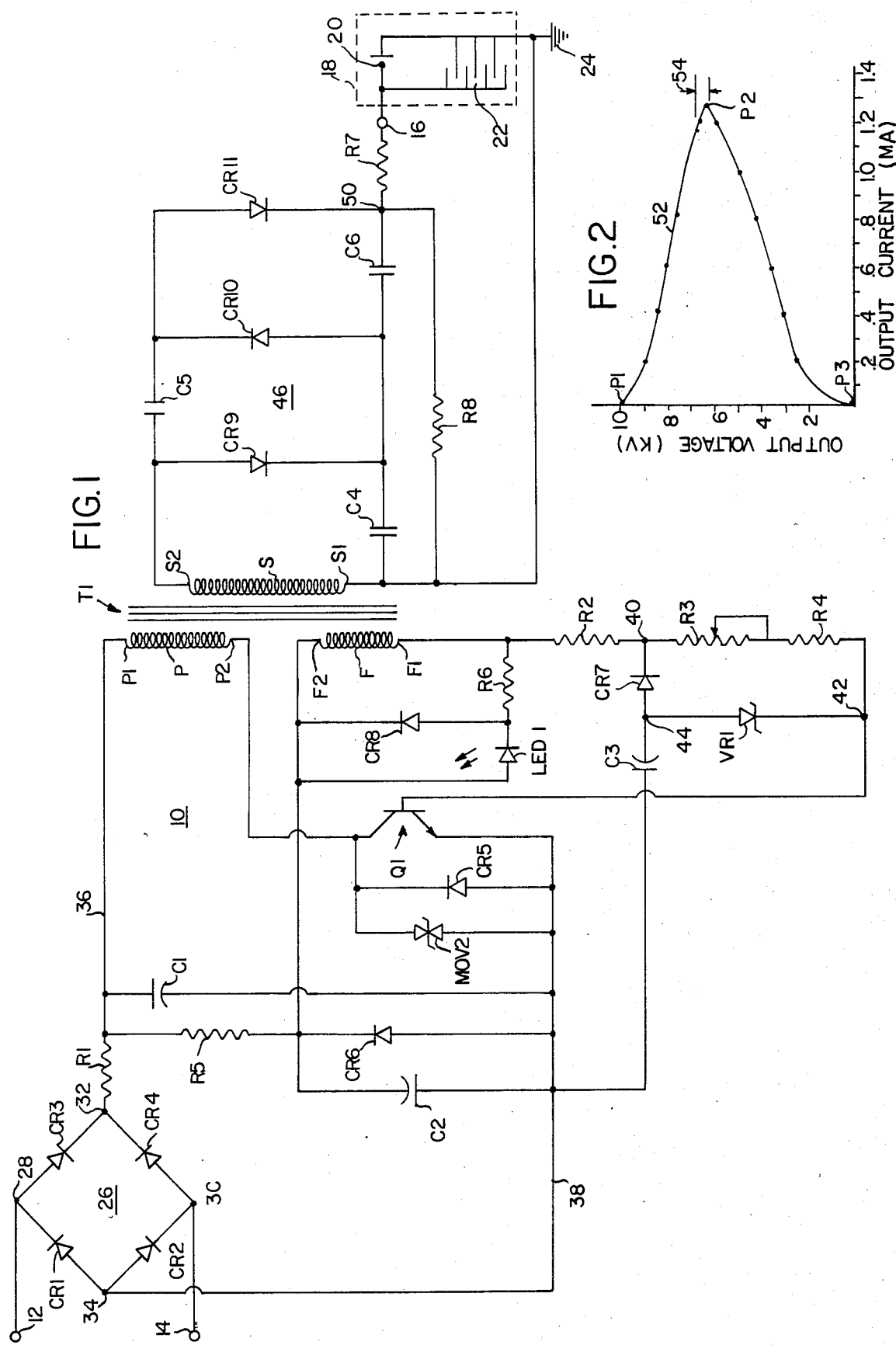

POWER SUPPLY FOR ELECTROSTATIC AIR CLEANER

BACKGROUND OF THE INVENTION

This invention relates to solid state power supplies for electrostatic air cleaners.

The prior art discloses various types of solid state power supplies for generating the high voltage required to operate an electrostatic air cleaner cell. Some of such prior art power supplies incorporate a high frequency oscillator which cooperates with a step-up transformer to produce directly, or through a further voltage multiplying means, the required high voltage. While such power supplies are generally suitable for their application, they are considered to be too complex or expensive, or too low in efficiency.

SUMMARY OF THE INVENTION

A primary object of this invention is to provide a generally new and improved solid-state power supply for an electrostatic air cleaner, which power supply is cost effective and efficient.

A further object is to provide such a power supply which incorporates a high frequency oscillator and a step-up transformer wherein the transformer includes a primary winding in series with a transistor, a secondary winding which cooperates with a voltage multiplying means to produce a desired output voltage, and a feedback winding; wherein the feedback winding is connected in circuit with the emitter-base circuit of the transistor to control the conduction thereof; wherein the feedback winding is further connected in circuit with circuit means for adjusting and limiting the biasing of the transistor; and wherein the power supply is adapted to be connected directly to a conventional 120 volt power source.

A salient feature of the present invention is that when the electrostatic air cleaner cell is shorted or arcing, the output power of the power supply is essentially zero and the power loss in the power supply is quite small.

The above-mentioned and other objects and features of the present invention will become apparent from the following description when read in conjunction with the accompanying drawings.

BRIEF DESCRIPTION OF THE DRAWINGS

FIG. 1 is a schematic diagram of the power supply of the present invention; and

FIG. 2 is a graphical illustration of the performance of the power supply of FIG. 1.

DESCRIPTION OF THE PREFERRED EMBODIMENT

Referring to FIG. 1, shown therein is a power supply 10 adapted to be connected by terminals 12 and 14 of a conventional 120 volt alternating current power source. Connected to an output terminal 16 of power supply 10 is an electrostatic cell 18. Cell 18 may be similar to the type shown in U.S. Pat. No. 4,089,661, issued May 16, 1978, to Jimmy L. Milum. Basically, cell 18 includes an ionizing section and a collector section. The ionizing section includes a plurality of ionizing wires 20 connected to output terminal 16. The collector section includes a plurality of collector plates 22, alternate ones of which are connected to output terminal 16 and to ground at 24.

A full wave bridge circuit 26, comprising rectifiers CR1, CR2, CR3, and CR4, is connected at input junctions 28 and 30 thereof to power source terminals 12 and 14, respectively, and at output junctions 32 and 34 thereof to the remaining components of power supply 10.

Connected across bridge output junctions 32 and 34 through a resistor R1 is a capacitor C1. Resistor R1 functions as a current limiter to limit excessive start current during initial charge of capacitor C1. Capacitor C1 is a filter, effecting the establishment of a filtered unidirectional voltage source of approximately 168 volts to exist between a lead 36 connected to one side of capacitor C1 and a lead 38 which is connected to the other side of capacitor C1 and to junction 34 of bridge circuit 26.

The primary winding P of a transformer T1 is connected at one end P1 to lead 36 and at its other end P2 to the collector of an NPN transistor Q1. The emitter of transistor Q1 is connected to lead 38. A metal oxide varistor MOV1 is connected across the collector-emitter of transistor Q1 to protect transistor Q1 against any high voltage spikes that may occur when cell 18 arcs. A rectifier CR5 is connected in reverse polarity across the emitter-collector of transistor Q1 to protect transistor Q1 from any reverse polarity spikes.

Transformer T1 also includes a feedback winding F having one end F1 connected through a fixed resistor R2, an adjustable resistor R3, and a fixed resistor R4 to the base of transistor Q1. The other end F2 of feedback winding F is connected through a resistor R5 to lead 36, and through a parallel-connected capacitor C2 and a rectifier CR6 to lead 38.

A capacitor C3 and a rectifier CR7 are connected in series between lead 38 and the junction 40 of resistors R2 and R3. The cathode of a voltage regulator VR1 is connected to the junction 42 of resistor R4 and the base of transistor Q1, and the anode thereof is connected to the junction 44 of capacitor C3 and rectifier CR7.

Connected across feedback winding F through a current limiting resistor R6 is a light emitting diode LED1. A rectifier CR8 is connected in reverse polarity across LED1. When end F2 of feedback winding F is positive, LED1 is energized through resistor R6; when winding end F1 is positive, rectifier CR8 conducts. When the frequency of the reversal of polarity of feedback winding F is sufficiently high, LED1 appears to be continuously on. When power supply 10 is not oscillating, LED1 is off. Thus, LED1 provides a visual indication of whether power supply 10 is or is not oscillating.

Transformer T1 also includes a secondary winding S. Connected to ends S1 and S2 of secondary winding S is a voltage tripler circuit 46 comprising capacitors C4, C5, and C6, and rectifiers CR9, CR10 and CR11. Winding end S1 is also grounded at 24.

In the preferred embodiment, the primary winding P comprises 120 turns of 29 gauge wire, the feedback winding F comprises 8 turns of 29 gauge wire, and the secondary winding S comprises 2200 turns of 36 gauge wire. The core of transformer T1 is a ferrite rod. Under normal operating conditions, transformer T1 enables the tripler circuit 46 to provide a DC voltage of approximately 6400 volts between ground 24 and an output junction 50 of tripler circuit 46. A resistor R7 is connected between output junction 50 and output terminal 16 to limit current flow through cell 18 during an arcing condition in cell 18. A resistor R8 is connected between output junction 50 and ground 24 to provide a bleed path for any stored charge in tripler circuit 46 and cell 18.

OPERATION

When power is initially applied to input terminals 12 and 14, transistor Q1 is biased on through a circuit from lead 36, through resistor R5, feedback winding F, resistors R2, R3, and R4, and through the base-emitter of transistor Q1 to lead 38. With transistor Q1 on, current begins to flow through primary winding P and the emitter-collector of transistor Q1. The rising current flow causes a rising flux in transformer T1. The rising flux induces a voltage in feedback winding F. The polarity of this induced voltage is such that winding end F1 begins to go negative. As winding end F1 goes negative, it effectively reverse-biases transistor Q1, causing transistor Q1 to turn off. When transistor Q1 turns off, the current flow through primary winding P abruptly ceases, causing a rapid collapse of the flux in transformer T1. The collapse of flux induces a voltage in feedback winding F. The polarity of this induced voltage is such that winding end F1 begins to go positive. As winding end F1 goes positive, it forward-biases transistor Q1 and the cycle repeats. The impedance of the circuit components of power supply 10 are such that the frequency of oscillation is approximately 80 KHz.

The above-described rise and fall of flux in transformer T1 also induces a voltage in secondary winding S. This voltage is multiplied by tripler circuit 46. When cell 18 is relatively clean, and ignoring the small voltage drop across resistor R7, the voltage established at output terminal 16 is 6400 volts with respect to ground 24.

Referring to FIG. 2, illustrated therein is a typical performance curve 52 for the power supply 10 of FIG. 1. When cell 18 is disconnected from power supply 10, the output voltage between output terminal 16 and ground 24 is approximately 10,000 volts, and obviously no current is flowing to cell 18. This "open-circuit" condition is defined at point P1 in FIG. 2. When cell 18 is connected to power supply 10 and is operating normally, the output voltage is between approximately 6200 and 6800 volts, as indicated at 54 in FIG. 2, and the output current (current to cell 18) is between approximately 1.15 and 1.25 milliamperes. Maximum output current of 1.25 milliamperes occurs at approximately 6400 volts and is indicated at point P2. When cell 18 is shorted or arcing, the output current "folds back" to zero and the output voltage drops to zero, a condition shown at point P3.

While some cells require approximately 1.25 milliamperes at approximately 6400 volts for proper operation, other cells may require more or less current at such voltage. A particular feature of power supply 10 is that it can readily be adjusted or modified to accommodate its use with a wide variety of cells.

Specifically, the output current is determined in part by the amount of biasing of transistor Q1. As shown in FIG. 1, resistors R2, R3, and R4 are connected in the base-emitter circuit of transistor Q1. The value of resistor R4 is selected to be such that the required biasing of transistor Q1 is established to effect the desired secondary current output; resistor R3 is provided to enable a fine adjustment of such secondary current output. Resistor R2, while in the biasing circuit, functions primarily to limit the current flow in a reverse-biasing condition, that is, when rectifier CR7 is conducting.

Thus, when the output current, as dictated by the structure of cell 18, is to be, for example, 1.75 milliamperes at 6400 volts, a different value of resistor R4 is employed, and resistor R3 is then adjusted to enable fine tuning to the desired 1.75 milliamperes. The performance curve for power supply 10 would then be similar to that of curve 52 of FIG. 2 except that point P2, which defines the maximum secondary current output, would occur at approximately 1.75 milliamperes instead of at 1.25 milliamperes, and point P1, which defines the open-circuit voltage, would be several hundred volts higher.

Capacitor C3 and rectifier CR7 enable the establishment at junction 44 of a DC bias, negative with respect to lead 38, when winding end F1 of feedback winding F is negative. This negative bias enables voltage regulator VR1 to limit the forward biasing of transistor Q1.

Rectifier CR6 conducts when winding end F1 of feedback winding F is positive. When winding end F1 is negative, capacitor C1 provides a low impedance current path so as to minimize degradation of the feedback signal.

As previously described, when cell 18 is not connected to power supply 10, the output voltage at output terminal 16 is approximately 10,000 volts. Under this condition, power supply 10 is oscillating. However, since only a small amount of current is flowing through primary winding P under such an open-circuit condition, very little power is dissipated in power supply 10.

When cell 18 is connected and operating normally, the power dissipated in power supply 10 is greater than at the open-circuit condition. However, due to various factors, such as the controlled biasing of transistor Q1 through the previously described biasing circuit, the dissipated power is relatively small. For example, we have found that the energy efficiency under this condition of normal cell loading is generally between 60 and 70 percent.

There are various conditions which can cause intermittent or continuous arcing in cell 18 between the ionizing wires 20 and those plates 22 which are grounded, and/or between alternate plates 22. Among such conditions are when cell 18 becomes dirty and when cell 18 is re-installed, after being washed, before it is completely dry. A particular feature of power supply 10 is that, under such conditions, the output power is essentially zero and the input power is very small, thus providing a more energy efficient and reliable operation. Specifically, during the instant time of the arcing, regardless of whether the arcing is intermittent or continuous, the arc appears as an electrical short across secondary winding S of transformer T1. With secondary winding S shorted, feedback winding F is also effectively shorted, and thus power supply 10 ceases oscillating. When power supply 10 is in this non-oscillating condition, only a small amount of current, a few milliamperes, flows through the emitter-collector circuit of transistor Q1. This small amount of current flow results in only a few microamperes of secondary current. Essentially, therefore, when power supply 10 is in the non-oscillating condition, output voltage and output current are essentially zero, and the input power is very small.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

What is claimed is:

1. In a power supply for energizing an electrostatic air cleaner cell, a unidirectional voltage source;

a transformer having a primary winding, a secondary winding, and a feedback winding, one end of said primary winding being connected to one side of said voltage source;

a transistor having its collector connected to the other end of said primary winding and its emitter connected to the other side of said voltage source, said transistor being adapted to be repetitively rendered conductive and non-conductive so as to cause repetitive rise and fall of current flow through said primary winding and thereby induce alternating voltage into said feedback winding and into said secondary winding;

voltage multiplying means connected to said secondary winding and responsive to said alternating voltage induced into said secondary winding for providing a high DC voltage for energizing the cell;

first circuit means connecting one end of said feedback winding to said one side of said voltage source;

second circuit means, in series with said first circuit means, connecting said one end of said feedback winding to said other side of said voltage source;

third circuit means connecting the other end of said feedback winding to the base of said transistor; and fourth circuit means connecting said other end of said feedback winding to said emitter of said transistor, said first circuit means including resistance means for enabling current flow through the base-emitter circuit of said transistor to initiate conduction of said transistor, said second circuit means including a capacitor and a rectifier connected in parallel to permit current flow during both polarities of said alternating voltage induced in said feedback winding, said third circuit means including adjustable resistance means for establishing a desired biasing of said transistor, said fourth circuit means including voltage regulator means for limiting said biasing of said transistor.

2. The power supply claimed in claim 1 wherein said voltage regulator means includes a capacitor and a rectifier connected in series so as to establish a negative DC bias at a junction therebetween, and a voltage regulator having its anode connected to said junction and its cathode to said base of said transistor.

* * * * *